US011408135B2

(12) United States Patent
Latham

(10) Patent No.: US 11,408,135 B2
(45) Date of Patent: Aug. 9, 2022

(54) MILLING CUTTING ELEMENT SYSTEM

(71) Applicant: Winchester E. Latham, Avon, IN (US)

(72) Inventor: Winchester E. Latham, Avon, IN (US)

(*) Notice: Subject to any disclaimer, the term of this patent is extended or adjusted under 35 U.S.C. 154(b) by 0 days.

(21) Appl. No.: 17/012,017

(22) Filed: Sep. 3, 2020

(65) Prior Publication Data

US 2020/0399841 A1 Dec. 24, 2020

Related U.S. Application Data

(63) Continuation of application No. 16/384,414, filed on Apr. 15, 2019, now Pat. No. 10,787,774, which is a continuation-in-part of application No. 15/210,074, filed on Jul. 14, 2016, now Pat. No. 10,260,206.

(60) Provisional application No. 62/200,579, filed on Aug. 3, 2015.

(51) Int. Cl.

| | |
|---|---|
| ***E01C 23/088*** | (2006.01) |
| ***B27C 1/00*** | (2006.01) |
| ***B23C 5/20*** | (2006.01) |
| ***B23B 27/08*** | (2006.01) |
| ***B27C 5/00*** | (2006.01) |
| ***B28D 1/18*** | (2006.01) |
| ***B02C 13/28*** | (2006.01) |

(52) U.S. Cl.
CPC ............ *E01C 23/088* (2013.01); *B02C 13/28* (2013.01); *B23B 27/083* (2013.01); *B23C 5/20* (2013.01); *B27C 1/005* (2013.01); *B27C 5/00* (2013.01); *B28D 1/188* (2013.01)

(58) Field of Classification Search
CPC ... B02C 13/28; B02C 2013/2808; B27C 1/00; B27C 1/002; B27C 5/00; B27C 5/06; B27G 13/04; B28D 1/188; E01C 23/088; E01C 23/127; B23B 27/083; B23C 5/20
USPC ......... 144/24.12, 334; 407/101, 102, 46, 47; 299/102, 103, 79.1, 108, 112 R; 241/296
See application file for complete search history.

(56) References Cited

U.S. PATENT DOCUMENTS

| | | | | | |
|---|---|---|---|---|---|
| 999,014 | A | * | 7/1911 | De Laney | |
| 1,032,636 | A | * | 7/1912 | Watkins ................ | B27G 13/04 144/230 |
| 4,326,592 | A | | 4/1982 | Stephenson | |
| 5,647,419 | A | * | 7/1997 | Stewart ................. | B27G 13/10 144/117.1 |
| 5,904,408 | A | | 5/1999 | Olson et al. | |

(Continued)

OTHER PUBLICATIONS

Dynatech Pavement Marking, dated Jan. 14, 2016, pp. 1-31, Dynatech, Elyria, Ohio.

(Continued)

*Primary Examiner* — Sunil Singh
(74) *Attorney, Agent, or Firm* — Crowell & Moring LLP

(57) ABSTRACT

A cylindrical cutting system, a bit holder assembly, and machine for milling or scarifying road surfaces are disclosed. A bit holder is attachable to a milling platform, and includes an inward facing surface for engaging a corresponding mating surface of the milling platform. The inward facing surface of the bit holder and the mating surface include aligning fastener and pin openings. A fastener and a pin are inserted within the respective openings to couple the bit holder to the milling platform. The mating surface may define a part of a recess formed in the milling platform. A wear element may be disposed at the leading side of the bit holder. Multiple platforms may be coupled together with axially extended platform fasteners.

19 Claims, 13 Drawing Sheets

(56) References Cited

U.S. PATENT DOCUMENTS

| | | | | |
|---|---|---|---|---|
| 6,364,227 | B1 * | 4/2002 | Dorscht | B02C 13/2804 241/197 |
| 6,520,440 | B2 | 2/2003 | Ragnarsson | |
| 7,069,969 | B2 * | 7/2006 | Knappett | B27G 13/005 144/176 |
| 7,086,812 | B2 * | 8/2006 | Gamble | B23C 5/08 407/46 |
| 7,959,099 | B1 | 6/2011 | Cox et al. | |
| 8,066,213 | B2 | 11/2011 | Marquardsen | |
| 2003/0010403 | A1 * | 1/2003 | Smith | B27G 13/04 144/241 |
| 2013/0334866 | A1 | 12/2013 | Pederson et al. | |
| 2014/0327294 | A1 | 11/2014 | Johnson et al. | |

OTHER PUBLICATIONS

Diamond Edged Cutter Blades for Asphalt, dated at least as early as 2012, pp. 1-8, available at URL: http://wel-co.com/wel-co_products/pavement-marking/diamond-edged-cutter-blades.html Wei-Co Diamond Tool Corp., 2012, Oldsmar, Florida.

* cited by examiner

MILLING CUTTING ELEMENT SYSTEM

CROSS REFERENCE TO RELATED APPLICATIONS

This application is continuation of U.S. Ser. No. 16/384,414 filed Apr. 15, 2019, which is a continuation-in-part of U.S. patent application Ser. No. 15/210,074 filed Jul. 14, 2016, which claims the benefit of U.S. Provisional Application No. 62/200,579, filed Aug. 3, 2015, all of which are incorporated herein by reference.

TECHNICAL FIELD

This disclosure generally relates to the field of rotary driven cylindrical cutter devices and scarifiers for use in surface milling. More particularly, the present disclosure is directed to a cutting element system for such rotary driven cylindrical cutter devices and scarifiers that can be used on equipment for modifying the surface of an existing road or other paved surface.

BACKGROUND

Milling equipment can be used for smoothing areas of existing pavement by removing bumps, upward projections, and other surface irregularities, removing paint stripes, and milling shallow recesses to receive roadway edging and marking tape. In general, roadway surface milling, planing, or reclaiming equipment can include a rotary driven cylindrical comminuting drum which acts to scarify and to mine the top portion of the asphaltic road surface in situ. Road planning machines are used to remove bumps and other irregularities on the surface of a road, runway, taxiway, or other stretch of pavement. This planing effect is typically achieved by grinding the paved surface so that the grinding depth may vary slightly, but the surface produced by the grinding unit is more level than the original surface. The road planning machine typically includes a grinding unit that is rotatably powered by a shaft coupled to an engine or motor. The grinding units can include individual cutter bits that are securely fixed to the grinding unit, but are removable for maintenance or replacement.

DETAILED DESCRIPTION

The use of milling equipment to plane roads and other paved surfaces results in milled material being dislodged from the paved surface. In addition, the paved surface may already have debris such as gravel, dirt and sand on the surface. This material is called drift. Due to the high velocity rotary motion during the milling process the drift can become airborne and strike the milling equipment. Because the drift is abrasive, this can cause wear on the equipment. In addition, due to the nature of milling being performed, wear on the milling equipment during the milling operation such as the cutter bits and other parts may occur.

A system includes a cutter bit that is formed to rigidly attach, typically through a cutter bit holder, to a rotational milling platform such as a drum or disk. The cutter bit is mounted on the milling platform to minimize exposure of the cutter bit holder to airborne drift. The milling platform may rotate about a central axis such that an outer surface of the milling platform is orthogonal to the central axis. The milling platform may be in the form of a series of commonly mounted, adjacently located disks that are concentric with the central axis and sequentially extend along a shaft positioned along the central axis. One advantage of the cutter bit holder configuration is the ability to removably attach the cutter bit holder to the milling platform. Once removed, a new, repaired, or remanufactured bit holder may be attached to the milling platform, while the worn one is discarded, repaired or remanufactured.

Figure 1:
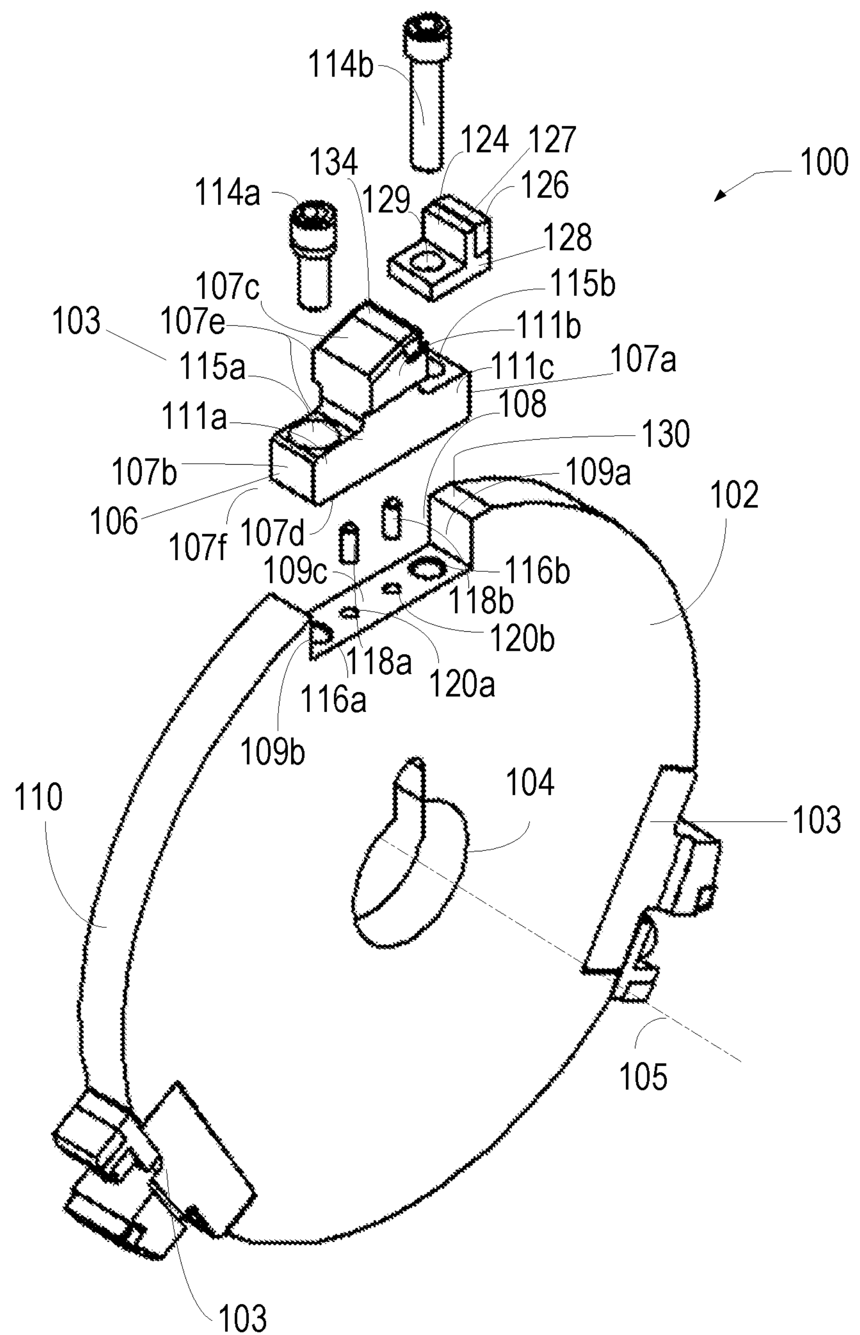
FIG. 1 is an exploded perspective view of an example milling cutting element system.

FIG. 1 is an exploded view of an example of a milling cutting element system 100 that includes a milling platform 102 (shown as a disk) and a plurality of cutter element assemblies 103 having a cutter bit 134 mounted to a bit holder 106. The milling platform 102 includes a central aperture 104 formed therein, such as, e.g., in the shape of a keyway for mounting on a shaft (not shown) such that the shaft and the milling platform 102 rotate together. In other examples, the milling platform 102 may be a drum or a series of disks that form a generally cylindrical rotational platform concentric with and capable of rotating about a central axis 105 along which the rotational milling platform extends.

The bit holder 106 may take the form of many geometric shapes. In one example, the bit holder 106 includes a leading edge 107*a*, a lagging edge 107*b*, an upper surface 107*c*, a lower surface 107*d*, a pair of lateral surfaces 107*e* together to define an outer surface of a bit holder body 107*f*. The milling platform 102 and the bit holder 106 may be made of steel, steel alloys, or other metals or metal alloys typically used in road scarifying applications, and formed with machining processes.

As will be described, the coupling between the bit holder 106 and the milling platform 102 may be of a variety of coupling arrangements. The bottom of the bit holder 106 may be coupled to a mounting surface formed on the milling platform 102, as will be described. For example, the bit holder 106 may be mounted within a recess 108 that is formed in a circumferential outer surface 110 of the milling platform 102 (shown as a cylindrical surface). In one example, as shown, the recess 108 is in the shape of a rectangular notch that is shaped and sized to receive the bit holder 106 that is in the shape of a rectangular cuboid. In this example, the recess 108 is defined by a leading recess edge 109*a*, a lagging recess edge 109*b*, and a bottom mating surface 109*c* that interconnects the leading recess edge 109*a* to the lagging recess edge 109*b*. Here, when the recess 108 receives the bit holder 106, one or more of the lateral surfaces 107*e* of the bit holder 106 can be exposed to allow access to the lateral surfaces. The terms "leading" and "lagging" are used herein to define orientation relative to the cutting direction (see FIG. 4). All of the confronting edge surfaces of the bit holder 106 and the recess 108, respectively, may be planar and engageable with one another for a more secure fit. In an example, the outer surface 110 of the milling platform 102 may have a width to accommodate at least one more bit holder across its width between the lateral surfaces of the milling platform.

As will be described, the configuration of the bit holder 106 may be a variety of configurations. For example, the bit holder 106 may have one or two notched upper corner ends to reduce the relative thickness of the respective ends between the upper and lower surfaces at or below the depth of the recess 108 when mounted. The notched corner along the lagging edge 107*b* defines a mounting portion 111*a*. Adjacent to the mounting portion 111*a* is a cutting tool holder portion 111*b*. The cutting tool holder portion 111*b* is elevated higher relative to, or extends away from, the mounting portion 111*a*, and in closer proximity to the leading edge 107*a* than the mounting portion 111*a*. In some examples of the bit holder 106, a notched corner may be formed along the leading edge 107*a* to define a second mounting portion 111*c*. As will be described, other examples of the bit holder 106 may not include the second mounting portion 111*c*. The relative thicknesses of the mounting portions 111*a*, 111*c* measured between the upper and lower surfaces may be the same or different. A lower part of the bit holder 106 and at least partially, if not all, of the mounting portions 111*a* and/or 111*c* may be positioned below the outer surface 110 of the milling platform 102 to minimize their exposure to wear due to airborne drift during operation, as will be described.

Figure 2:
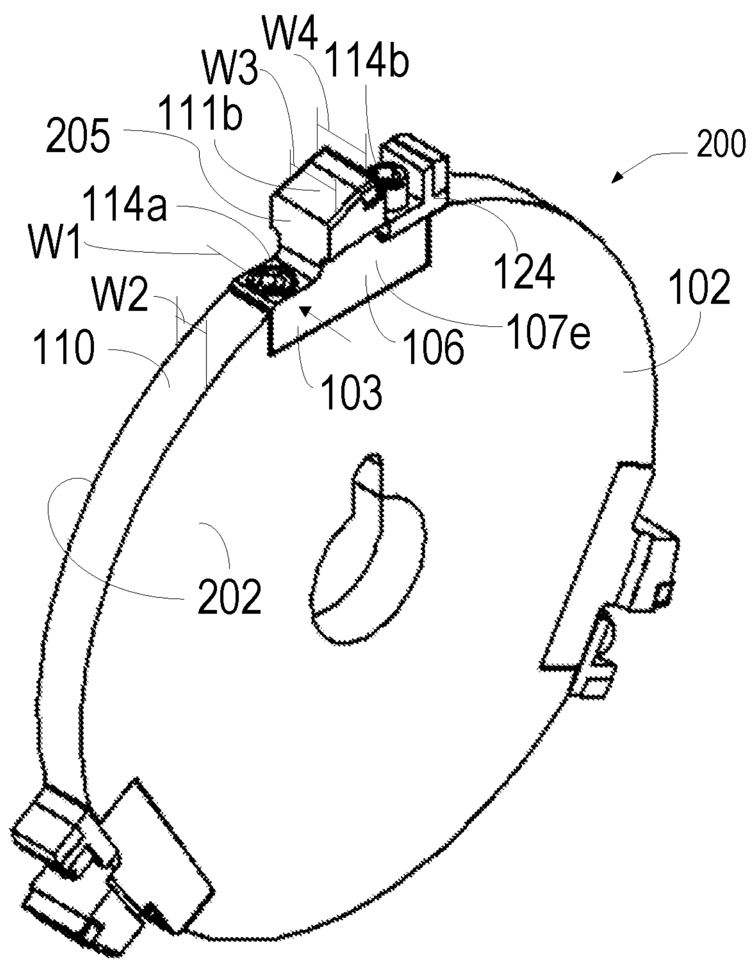
FIG. 2 is a perspective view of an example the milling cutting element system similar to the system illustrated in FIG. 1.

With reference to FIG. 2, the width W1 measured between the lateral surfaces 107*e* of the bit holder 106 that is positioned along or below the outer surface 110 may be dimensioned to be substantially the same (within plus or minus 0.02 inches) as the width W2 between lateral surfaces 202 of the milling platform 102. In one example, the width W1 is less than the width W2, for example, by about 0.02 inches. In an example, the lateral surfaces 107*e* along the upper portion 205 of the cutting tool holder portion 111*b* that is positioned above the outer surface 110 may have a width W3 greater than the width W1 of the bit holder 106, and projecting beyond the width W2 of the milling platform. The width W4 of the cutter bit 134 is measured between lateral surfaces of the cutter bit. The width W4 of the cutter bit 134 may be greater than the width W1 of the bit holder 106, such as, for example, up to about 0.03 inches. Here, the wider lateral surfaces of the cutter bit may facilitate a longer service life from the bit holder.

Figure 4:
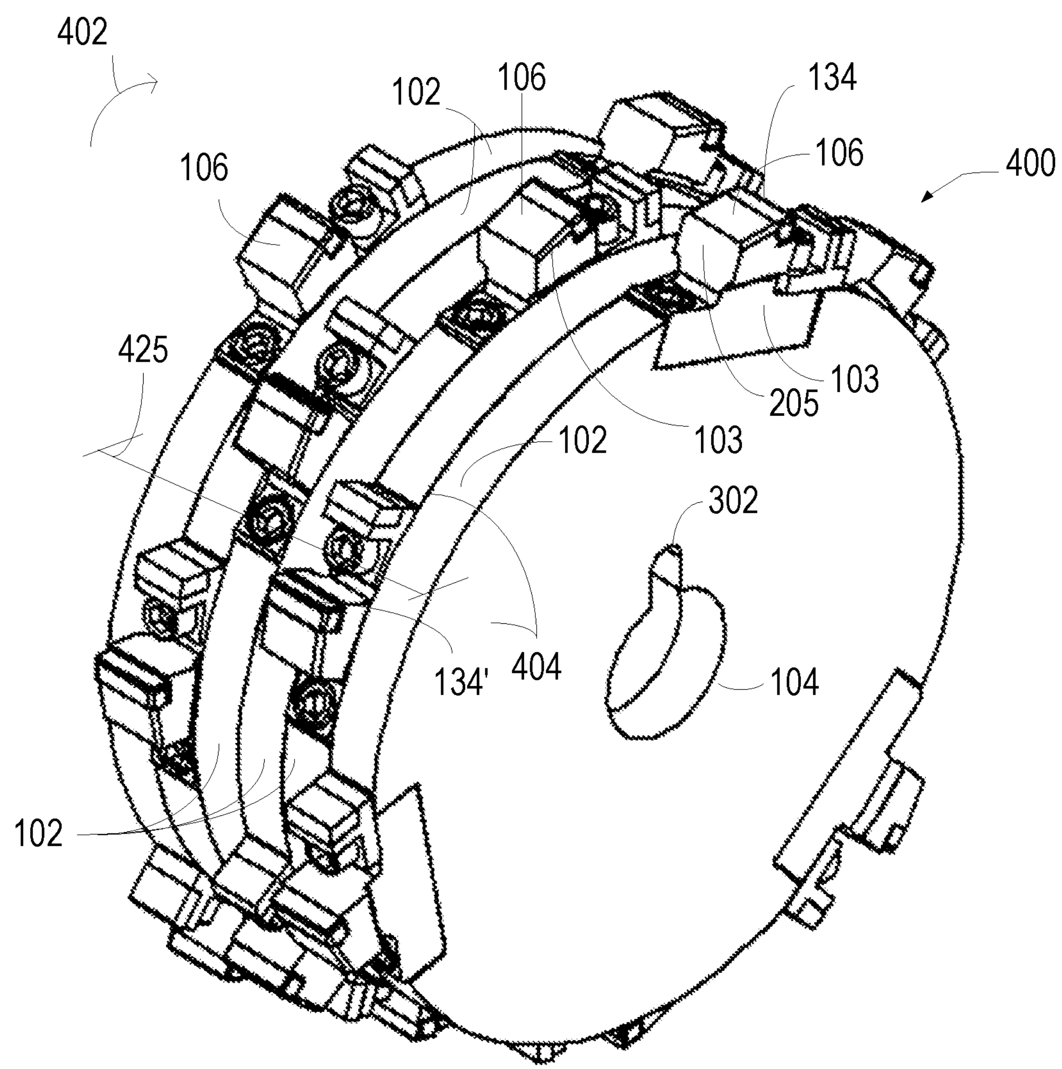
FIG. 4 is a perspective view of an example of a multi-platform cutting element system.

As may be seen in FIG. 4, the width W3 of the upper portion 205 of the cutting tool holder portion 111*b* may be the substantially the same as the width W4 of the cutter bit 134. In one example, the width W4 may be greater than the width W3 to protect the cutting tool holder portion corners from drift. The width W4 of the cutter bit and/or the width W3 of the cutting tool portion 111*b* may be sized greater than the width W2 of the milling platform 102 to encroach or extend beyond the lateral surface of the adjacent milling platform. In one example, the widths W1, W2, and W3 can be the same, with the width of W4 of the cutter bit 134 sized to overlap the adjacent the cutter bit. To this end, the cutter bit 134 positioned on each of the milling platforms 102 may extend beyond the lateral surfaces 404 of the respective adjacent milling platform 102 to overlap each other. For example, the illustrated cutter bit 134 along the milling platform 102 overlaps the cutter bit 134' along the adjacent milling platform 102. The overlapping cutter bits 134, 134' are positioned to define a uniform and continuous cutting surface 425 along the entire width of all of the milling platforms having a dimension of various cutting widths. In one example, the continuous cutting surface 425 formed by a rotation of the milling platforms has a dimension of at least five inches. Milling platforms can be added or removed to increase or decrease the width of the cutting surface below or above five inches.

Figure 3:
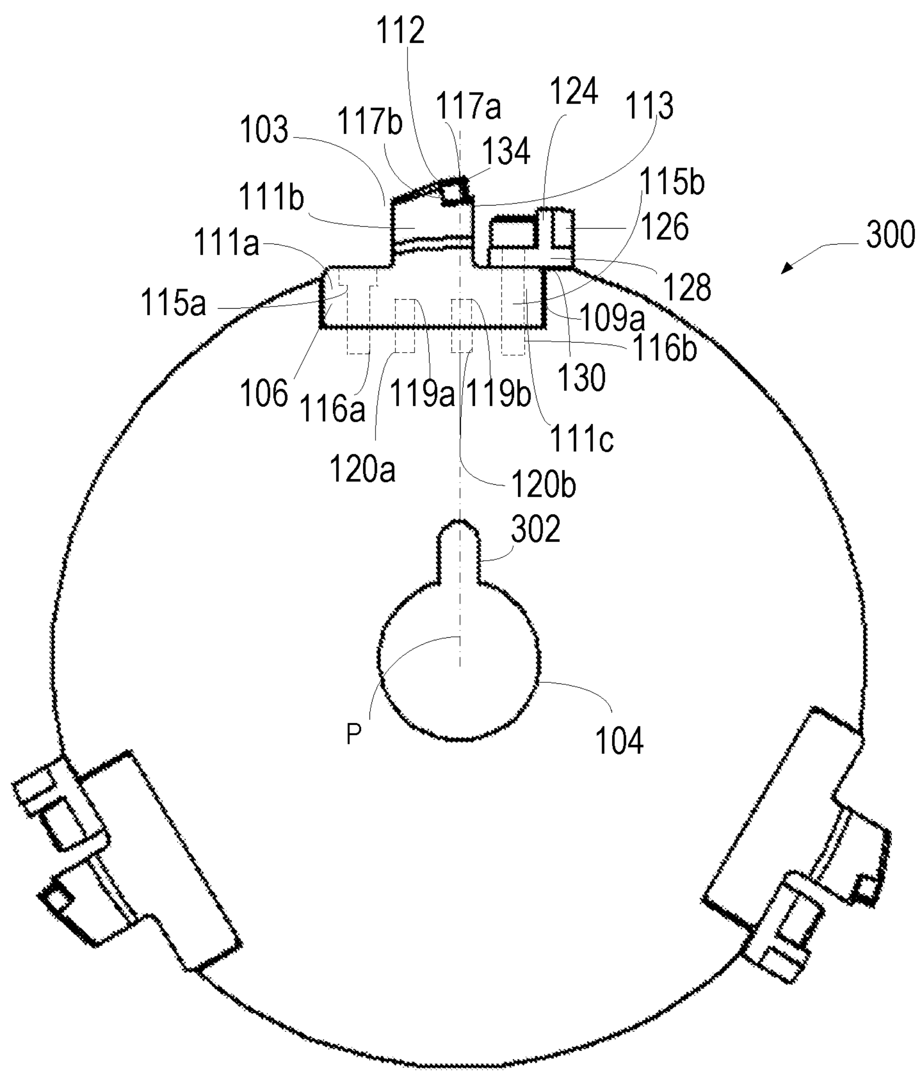
FIG. 3 is a frontal view of an example of a milling cutting element system similar to the system FIG. 2.

With additional reference to FIG. 3, the bit holder 106 may include a cutter bit mounting feature 112 to receivably mount to the cutter bit 134, although in some examples, the cutter bit 134 is integrally formed into the bit holder 106. The cutter bit mounting feature 112 may be included with the cutting tool holder portion 111*b*, or may alternatively be included with other portions of the bit holder 106. In one example, the cutter bit mounting feature 112 is formed by a notch disposed along the intersection of the upper surface and a leading face surface 113 of the cutting tool holder portion 111*b*. The cutter bit mounting feature may extend between the lateral surfaces 107*e* of the upper portion of the cutting tool holder portion 111*b* having the width W3. Such notch that defines the cutter bit mounting feature 112 may be defined by a base surface 117*a* and an upright surface 117*b* extending from the base surface 117*a*. The relative orientation of the base surface 117*a* and the upright surface 117*b* may be angled relative to one another at various angles to better position the cross-sectional shape of the cutter bit 134 at its final rake angle orientation for cutting. In one example, the base surface 117*a* is extended at an oblique angle relative a plane P extending from the axis 105, and the upright surface 117*b* is extended perpendicular to the base surface 117*a*.

The cutter bit 134 is coupled to the bit holder 106. The cutter bit 134 may be mounted on a member forming part of the bit holder 106, or may be integrally formed with the bit holder 106. The cutter bit 134 may be a hardened material such as carbide steel, or sintered polycrystalline diamond. The cutter bit 134 may be extended above the outer surface 110 of the milling platform 102. In one example, the cutter bit 134 is a sintered polycrystalline diamond that is brazed to the base and upright surfaces 117*a*, 117*b*. In one example, the cutter bit 134 has a rectangular cross-section, and the intersection of the cutter bit surfaces (the upper and rake face surface) forms the cutting edge.

The bit holder 106 may be removably coupled to the milling platform 102 with one or more fasteners (two shown in FIG. 1). The fasteners 114*a*, 114*b* may be received in fastener openings 115*a*, 115*b*, respectively, that are formed in the bit holder 106, which extend through the upper and lower surfaces. The fasteners openings 115*a*, 115*b* may be positioned in alignment with base openings 116*a*, 116*b* formed in the mating surface 109*c* of the milling platform 102. One of the fastener openings, such as the lagging fastener opening 115*a*, may be formed with a reduced cross-sectional area to define an internal flange to engage a shoulder that may be part of the fastener 114*a*. The shaft of the fasteners 114*a*, 114*b* and the base openings 116*a*, 116*b* may be configured for threaded engagement. The head tip of the fasteners (shown as the fastener 114*a*) once received in the base openings 116*a*, 116*b*, may be positioned below the outer surface 110 of the milling platform 102 so that exposure of the head of the fastener 114*a* to wear due to airborne drift during operation is minimized. In an alternative example, for example, the fastener 114*a* and/or 114*b* may include a threaded central aperture formed therein to receive the separate fastener, and/or one or more separate fasteners may be received in apertures formed in the milling platform 102 or the bit holder 106.

In an example, the cutter element assembly 103 may include further attachment and alignment features. For example, the lower surface 107*d* (i.e., the radially inward or milling platform facing surface) of the bit holder 106 may include one or more pin bit holder openings 119*a*, 119*b* (shown in dotted lines in FIG. 3). One or more pin base openings 120*a*, 120*b* may be formed in the outer surface 110 of the milling platform. One or more mounting pins 118*a*, 118*b* may be positioned to be received in the pin openings of the bit holder 106 and the pin base openings 120*a*, 120*b* in the milling platform 102 to maintain the bit holder 106 rigidly coupled to the milling platform 102. The mounting pins 118*a*, 118*b* may be adapted to strengthen the coupling of the bit holder to the milling platform, especially to withstand side or lateral loads. When included, the pin couplings may be located between the fastener couplings, as shown, although other arrangements are possible, as will be described. In one example, the placement and alignment of the mounting pins may be substantially parallel to the lateral surfaces of the milling platform. In another example, the placement and alignment of the mounting pins may be offset relative to the lateral surfaces in order to place the bit holder at a predetermined angle.

Figure 13:
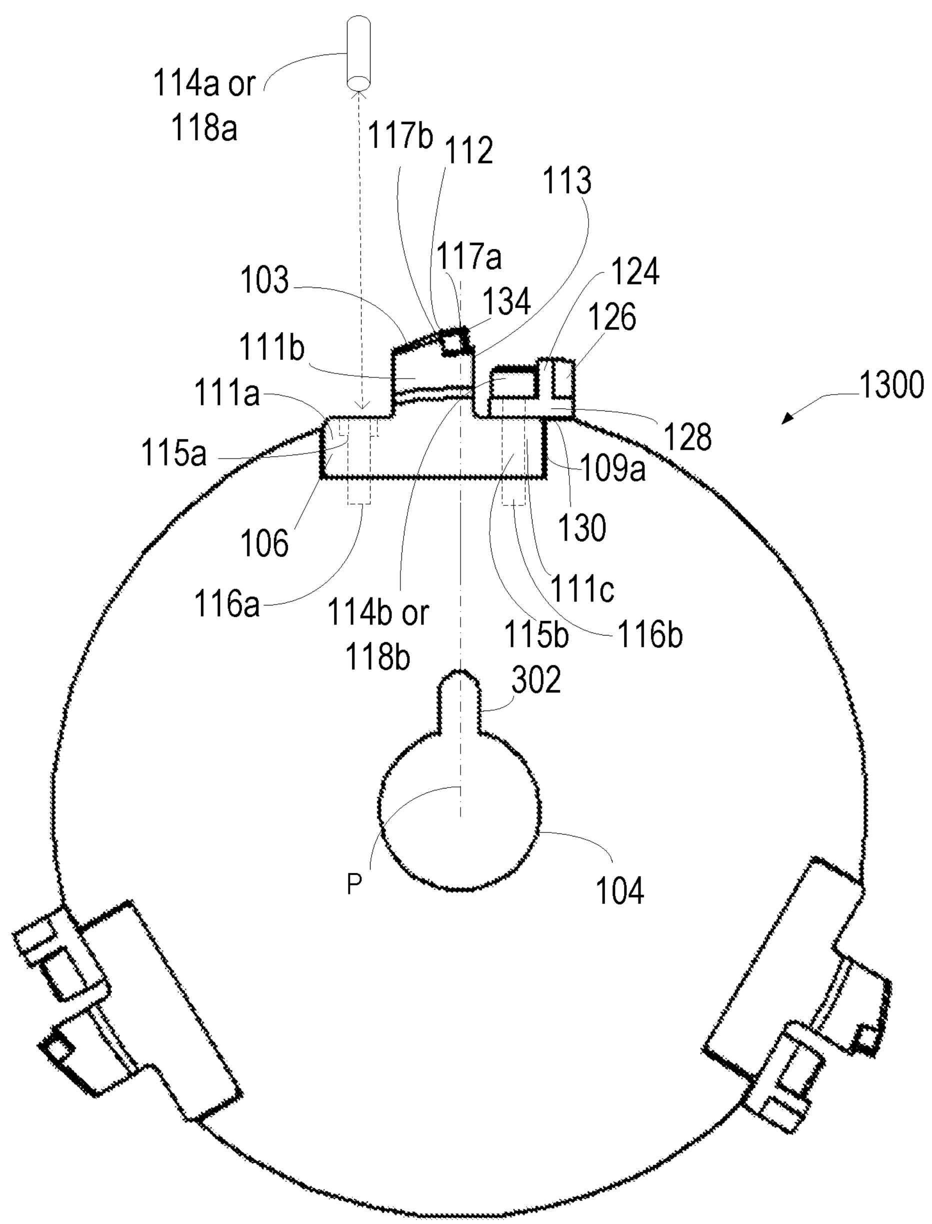
FIG. 13 is a frontal view of an example of a milling cutting element system.

As further discussed herein, the bit holder 106 may be configured to interchangeably receive one or more fasteners 114*a*, 114*b* and/or one or more pins 118*a*, 118*b* in each of one or more base openings 116*a*,116*b*, and the one or more pin base openings 120*a*, 120*b* illustrated in FIG. 1 as positioned between base openings 116*a*, 116*b* may be omitted as illustrated, for example, in FIG. 13. In an example configuration, fastener 114*b* may, for example, be insert through fastener opening 115*b* and threaded into base opening 116*b*, and pin 118*a* may be inserted through fastener opening 115*a* and threaded into base opening 116*a*. In other example configurations, pin 118*b* may, for example, be insert through fastener opening 115*b* and threaded into base opening 116*b*, and fastener 114*a* may be inserted through fastener opening 115*a* and threaded into base opening 116*a*. These configurations may strengthen the coupling of the bit holder 106 to the milling platform 102, to withstand loading, including side or lateral loads. In other examples, the at least one pin 118*a*,118*b* may be omitted.

The one or more pins 118*a*, 118*b* may be removable by being threaded and include a recessed fitting such as a slot, star hex or any other predetermined slot or void accessible from the top of pin 118*a*, 118*b* to receive a tool such as a screwdriver, allen wrench, hex key, star key, square key, and the like. In other examples, the one or more pins 118*a*, 118*b* may include a protrusion, such as a bolt head capable of being received in a tool, such as a socket wrench for installation and removal.

In addition, the one or more pins 118*a*, 118*b* may for example, include a upper flange, ridge or other protrusion to engage with fastener opening 115*a* and 115*b* as pin 118*a*, 118*b* is threaded into base opening 116*a*, 116*b*. In still other examples, the one or more pins 118*a*, 118*b* may be tapered and fastener opening 115*a* and 115*b* may be correspondingly reverse tapered, and/or pin 118*a*, 118*b* and fastener opening 116*a*, 116*b* may be correspondingly formed to fixedly mate, engage or otherwise form a frictional or held relationship such that the bit holder 106 is fixedly held against the mating surface 109*c* of the milling platform 102 by the one or more pins 118*a*, 118*b*.

In still other examples, one or more pins 118*a*, 118*b* may be removably held in fastener opening 115*a*, 115*b* and/or base openings 116*a*, 116*b* by a set screw, quarter or half turn lock, friction fit, snap fit and/or any other mechanism or combination of mechanism for fixedly maintaining bit holder 106 in contiguous and aligned contact with mating surface 109*c* of the milling platform 102 using pin 118*a*, 118*b*. The fastener and pin configurations/relationships described herein may be used with any of the various bit holder and milling platform configurations described throughout FIGS. 1-13.

A wear element 124 may also be included and coupled adjacent the bit holder 106 as part of the cutter element assembly 103. The wear element 124 may be coupled in front of a leading face surface 113 of the cutting tool holder portion 111*b* of the bit holder 106 to shield or deflect drift away from the body of the bit holder. In one example, the wear element 124 is detachably mounted to the bit holder 106 generally above the mounting portion 111*c* and is in closer proximity to the leading edge 107*a* than the cutting tool holder portion 111*b*. A wear resistant surface 126 may be positioned to be in the path of airborne drift. The wear resistant surface 126 may be carbide steel, titanium, or any other wear resistant material. The wear resistant surface 126 may be a separate element mounted on the wear element 124 (as shown), or may be an integral part of the wear element 124.

In an example, the wear element 124 may include a wear element base 128 with the wear resistant surface 126 extending out from the base 128 and positioned at the leading end of the wear element 124. The wear element 124 may include an upright portion 127 extending out at an angle generally orthogonal relative to the base 128. The upright portion 127 may be extended obliquely at other angles. The wear element 124 may be coupled to the bit holder 106 in numerous ways. For example, in FIG. 1, a lagging portion of the wear element base 128 may include a wear element base opening 129 formed therein, through which the fastener 114*b* may be inserted there through to couple the wear element 124 to the bit holder 106. In particular, the wear element base opening 129 is to be aligned coaxially with the fastener opening 115*b* formed in the second mounting portion 111*c* of the bit holder 106 and the base opening 116*b* of the milling platform in order for a single fastener 114*b* to be used. In another example, as will be described in relation to FIG. 8, the wear element base 128 may be coupled to the leading face surface 113 of the cutting tool holder portion 109*b*, for example, using a separate third fastener.

In one example, the wear element 124 may be positioned to extend beyond the leading recess edge 109*a* in the cutting direction such that the wear element 124 overlaps both the bit holder 106 and a portion of the milling platform 102. To this end, a planar surface 130 may be formed in the milling platform 102. This can permit the base 128 of the wear element 124 to also be contiguously aligned with the planar surface 130 such that the base 128 and the wear resistant surface 126 can be extended beyond the leading edge 107*a* of the bit holder 106. Here, the wear resistant surface 126 is disposed above the outer surface 110 to minimize exposure of the bit holder 106 to drift during operation. In alternative examples, the wear element 124 may be coupled with the milling platform 102. Additional wear resistant surface material can be adapted and placed to cover the lateral surfaces of the wear element 124 and/or the bit holder 106, including those wear elements 124 attached to the outermost milling platforms 102 that are exposed to the drift. In an example, the wear element 124 which may be mounted as described herein may include a first lateral portion and/or a second lateral portion extending along the respective lateral surfaces of the cutting tool holder portion or bit holder from the leading surface of the wear element 124. Here, a wear resistance material can be applied to the lateral surfaces of the wear element to provide additional wear resistant protection against the working environment and drift.

In another example configuration, the wear element 124 may be omitted, as will be described. In another example, the wear resistant surface 126 may be formed on, or coupled with, the bit holder 106. In alternative examples, the wear element 124 may be coupled with the outer surface 110 of the milling platform using a separate fastener threaded into a threaded bore formed in the outer surface 110. In other examples, there may be one or multiple wear resistant elements mounted on the wear element 124 and/or the bit holder 106. When there are multiple wear elements 124, each of the wear elements 124 may be positioned with an outer surface positioned at a predetermined angle with respect to the central axis 105, such as 45 degrees, to deflect drift away from the bit holder 106.

FIG. 2 is a perspective view of an example of a milling cutting element system 200 similar to the milling cutting element systems described herein. As illustrated in FIG. 2, a fastener 114*a* may be recessed into the bit holder 106 so as to be positioned below the outer surface 110 of the milling platform 102. Alternatively, the fastener 114*b* may be positioned above the outer surface 110 of the milling platform 102, being located in a space defined between the raised cutting tool holder portion 111*b* of the bit holder 106 and the wear element 124 to shield the fastener 114*b* from drift. In examples where the wear element 124 is omitted, as will be described, the fastener 114*b* may be recessed in the bit holder 106 to be positioned below the outer surface 110 of the milling platform 102. Alternatively, or in addition, the bit holder 106 may be recessed into the milling platform 102 toward the central axis 105 so that the fastener 114*b* (whether recessed into the bit holder 106 or not) is below the outer surface 110 of the milling platform 102.

FIG. 3 is a side view of an example a frontal view of an example of a milling cutting element system 300 similar to the other systems described herein. FIG. 3 illustrates, among other things, an example of a number of bit holders 106 recessed into the milling platform 102 and the wear element 124 positioned thereon. In other examples, any number of bit holders 106 and wear elements 124 may be included. The central aperture 104 is illustrated in this example as being a keyway having a slot 302 to maintain a rigid position between the milling platform 102 and the shaft having a corresponding mating rib (not shown) that aligns with the slot 302. In addition, the slot 302 serves to fixedly position the orientation of the bit holders 106 around the circumference of the milling platform 102.

FIG. 4 is a perspective view of an example of a multi-platform cutting element system 400 including milling cutting element system similar to the other systems described herein. In FIG. 4, the bit holders 106 on the different milling platforms shown as milling platforms 102 are staggered or offset from one another in a cutting direction 402, however, the slots 302 in the central aperture 104 are aligned. Each milling platform 102 includes a pair of lateral surfaces 404. Confronting lateral surfaces of adjacent milling platform may contact one another to form a continual surface and to limit dirt and debris from entering in between the milling platforms. In an example, the lateral surface 404 of the milling platform 102 confronting the lateral surface 404 of an adjacent milling platform 102 may be in a contacting relationship. Alternatively, the milling platforms may be positioned to include a gap between the confronting lateral surfaces.

Figure 5:
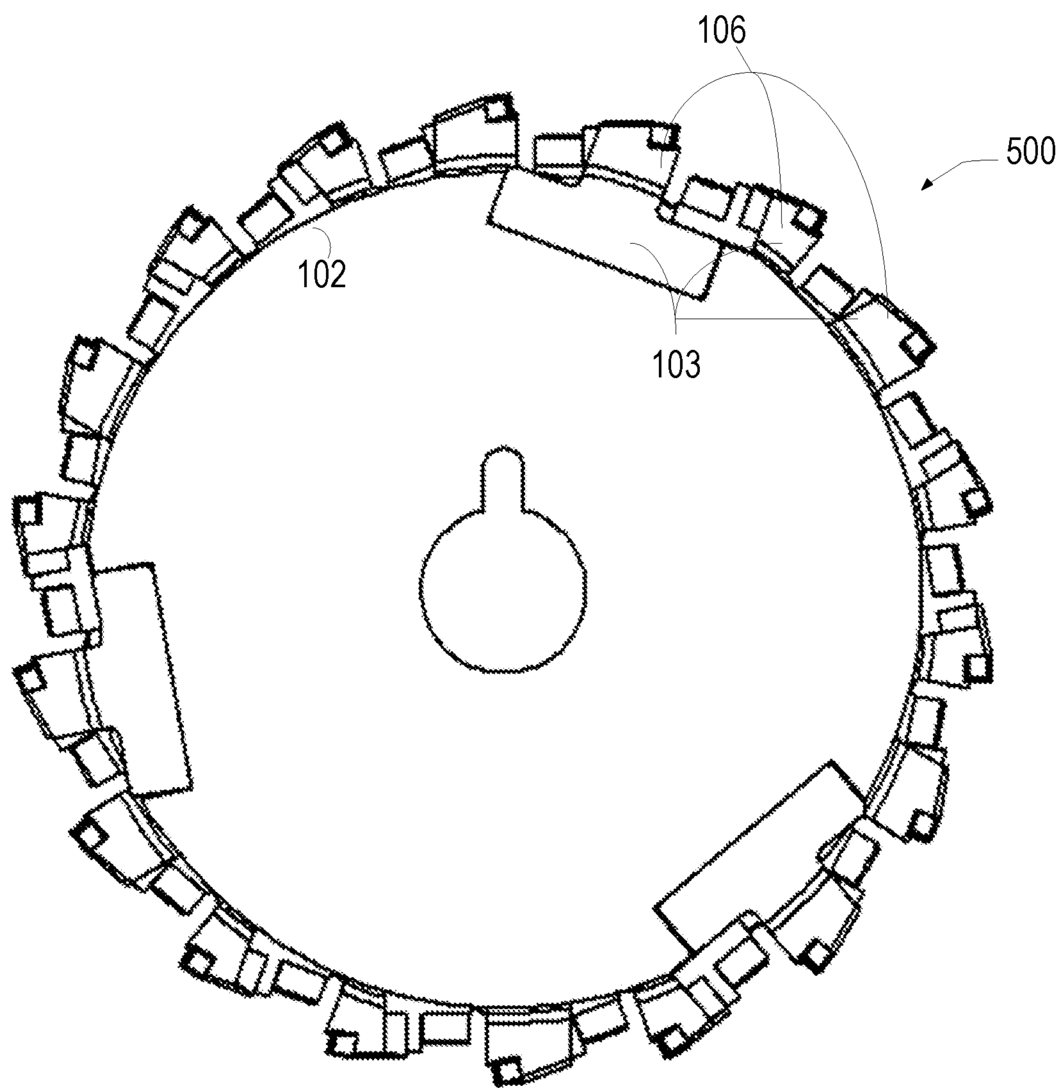
FIG. 5 is a frontal view of an example of a multi-platform milling cutting element system similar to the system illustrated in FIG. 4.

FIG. 5 is a frontal view of an example of a multi-platform milling cutting element system 500 similar to the other systems described herein, such as the system illustrated in FIG. 4. FIG. 5 illustrates the staggering of multiple milling platforms 102 having the bit holders 106 so as to create a more uniform cutting surface being applied to the pavement. In other examples, apertures in the milling platforms 102, and multiple shafts sized to be received in the apertures, may be used to maintain a rigid position of the milling platforms 102 with respect to the shaft(s). In the example configuration of apertures in the milling platforms 102 and multiple shafts, the locations of the apertures in the milling platforms may be offset from one another in different milling platforms 102 to fixedly position the orientation of the bit holders 106 around the circumference of the milling platform 102 at different offset positions. In another example, apertures in the milling platforms 102 and multiple shafts may aligned, however due to the holes being in different positions, the bit holders 106 included on the different milling platforms 102 may be staggered or offset from each other in the cutting direction 402 as illustrated. This is better described below in relation to FIG. 6.

Figure 6:
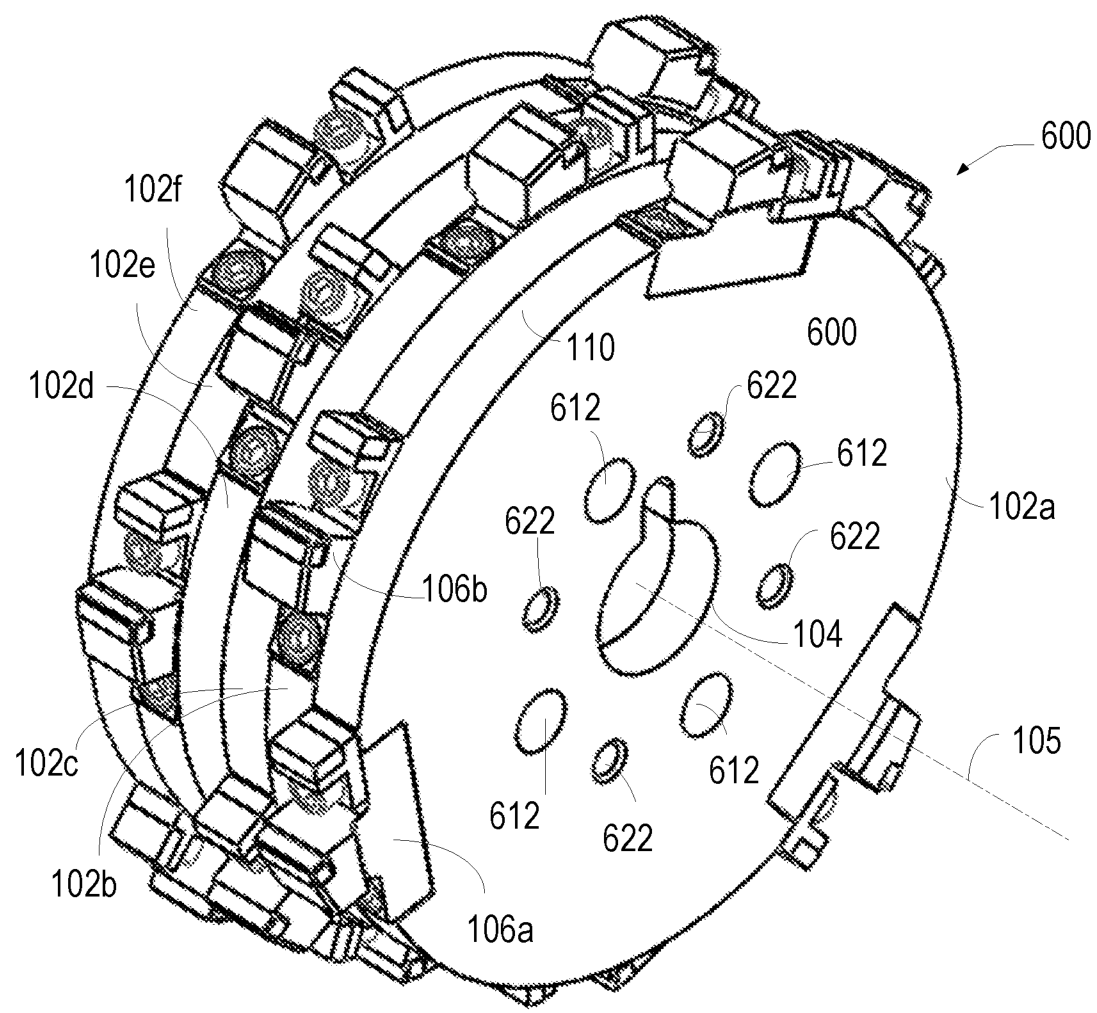
FIG. 6 is a perspective view of an example of a multi-platform cutting element system.

FIG. 6 is a perspective view of an example of a multi-platform cutting element system 600 similar to the other systems described herein, such as illustrated in FIG. 4. Here, each of the milling platforms 102*a*, 102*b*, 102*c*, 102*d*, 102*e*, 102*f* (six shown) may include at least one positioning aperture extending laterally through the body of the milling platform to be used to assist in the staggering in an offset pattern the multiple milling platforms. The positioning aperture may be disposed in an annular region of the body defined between the outer surface 110 and the central aperture 104. The milling platforms 102*a*, 102*b*, 102*c*, 102*d*, 102*e*, 102*f* may include a plurality of positioning apertures, where the aperture centers of the positioning apertures each are spaced from the axis in a manner to define a circular pattern about the axis 105. The apertures can define other shapes or aligned along different patterns. In an example, each of the milling platforms 102*a*, 102*b*, 102*c*, 102*d*, 102*e*, 102*f* includes a plurality of first positioning apertures 612 (e.g., four shown) alternating with a plurality of second positioning apertures 622 (e.g., four shown). The aperture centers of the first and second positioning apertures 612, 622 may be spaced circumferentially from one another and from the axis 105 in order to define a circular pattern about the axis 105, as shown. The location of the first positioning apertures 612 of one of the milling platforms (e.g., the milling platform 102*a*) may then be aligned with the second apertures (not shown) of an adjacent milling platform (e.g., the milling platform 102*b*) such that bit holders 106*a* of the first milling platform 102*a* are staggered from the bit holders 106*b* of the adjacent second milling platform 102*b*. Platform fasteners (not shown) may then be used to removably attach the milling platforms 102*a*, 102*b* together to fix the relative position between the milling platforms. The platform fasteners can be removed subsequently to take apart the milling platforms.

Figure 7:
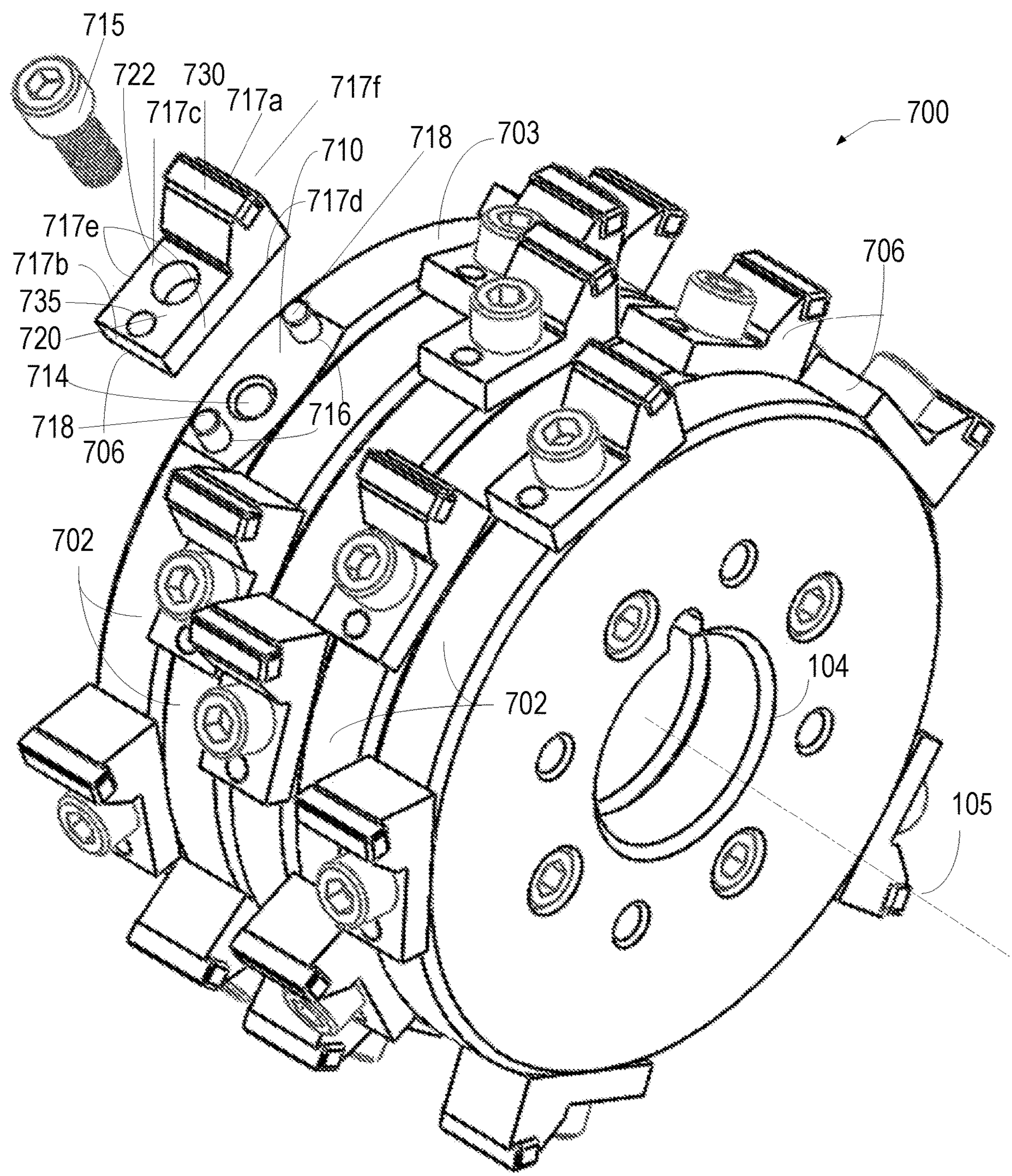
FIG. 7 is an exploded perspective view of an example milling cutting element system similar to the system illustrated in FIG. 6.

FIG. 7 is a perspective view of an example of a multi-platform cutting element system 700 similar to the other systems illustrated herein. The system 700 includes the staggering of multiple milling platforms 702 having the bit holders 706 so as to create a more uniform cutting surface being applied to the pavement.

The milling platform 702 share many common features of the milling platform 102 and others described herein. For example, the milling platform 702 includes the central aperture 104 formed therein for mounting on the shaft (not shown) such that the shaft and milling platform 702 rotate together. The milling platform configuration forms a generally cylindrical rotational platform concentric with and capable of rotating about the central axis 105 along which the rotational milling platform extends. The milling platform is shown including the first positioning apertures 612 alternating with the second positioning apertures 622.

The mating surface 710 may be formed on the outer surface 702 to be slightly recessed in comparison to the recess 108 formed in the milling platform 702 or without any recess, i.e., the mating surface 710 may be planar surface without a leading edge or lagging edge being formed. The mating surface 710 may include at least one fastener base opening 714 to receive the fastener 715 and at least one pin base opening 716 to receive a corresponding number of mounting pins 718. In one example, the mating surface 710 includes a single fastener base opening 714 and a pair of pin base openings 716 positioned around the fastener base opening 714. As shown, the mounting pins 718 may be inserted into the pin base openings 716.

In other examples, as described herein, a single pin 718 may be used with fastener 715. Pin 718 may also be threaded to be interchangeable with fastener 715 to threadedly and removably engage with the milling platform 702. In addition, as described herein, pin 718 may be configured to engage with the bit holder 706 as described herein. Also, as described herein, the fastener base opening 714 and the fastener 715 may be in front of the cutting tool holder portion 730 (in the cutting direction ahead of the leading edge 717*a*), and pin base opening 716 and pin 718 may be behind the fastener base opening 714 and the fastener 715. In this example configuration, pin base opening 716 and pin 718 may be positioned vertically below cutting tool holder portion 730 as illustrated, or vertically behind (in the cutting direction adjacent the) cutting tool holder portion 730, such as in the illustrated position of fastener opening 722 and fastener base opening 714 and/or pin bit holder opening 735 and pin base opening 716. The various fastener and pin configurations described herein may be used with any of the various bit holder and milling platform configurations described throughout FIGS. 1-13.

The bit holder 706 includes the leading edge 717*a*, the lagging edge 717*b*, the upper surface 717*c*, the lower surface 717*d*, and the pair of lateral surfaces 717*e* together to define the outer surface of the bit holder body 717*f*. The mounting portion 720 of the bit holder 706 defined along the lagging edge 717*b* may include one or more fastener openings 722 extending through the upper and lower surfaces 717*c*, 717*d* of the bit holder body 717*f*. In one example, the bit holder 706 includes one fastener opening 722. The cutting tool holder portion 730 may be elevated higher relative to, or extending from, the mounting portion 720 and positioned to be in closer proximity to the leading edge 717*a* than the mounting portion 720. The pin bit holder opening 735 may be formed into the lower surface 717*d* of the bit holder 706 to receive the corresponding mounting pin 718. The pin bit holder opening 735 may be formed into the lower surface of the cutting tool holder portion 730, the mounting portion 720, or both. In one example, the pin bit holder openings 735 are formed into the lower surface of the cutting tool holder portion 730 and the mounting portion 720.

To couple the bit holder 706 to the mating surface 710 of the milling platform 702, the mounting pin 718 is inserted, threaded into and/or removably engaged with the corresponding pin base opening 716 and the pin bit holder opening 735 when aligned. The fastener 715 may be removably coupled to the mating surface 710 of the milling platform when the fastener base opening 714 and the fastener openings 722 are in alignment. The head of the fastener 715 may be recessed below the upper surface of the mounting portion 720. In an example, the head of the fastener 715 when coupled may be positioned above the mounting portion 720, and is shielded from drift during operation by the elevated cutting tool holder portion 730 that is extended above the fastener headed. Although not shown, the bit holder 706 may include a second mounting portion, additional fasteners, and any examples of the wear element described herein.

Figure 8:
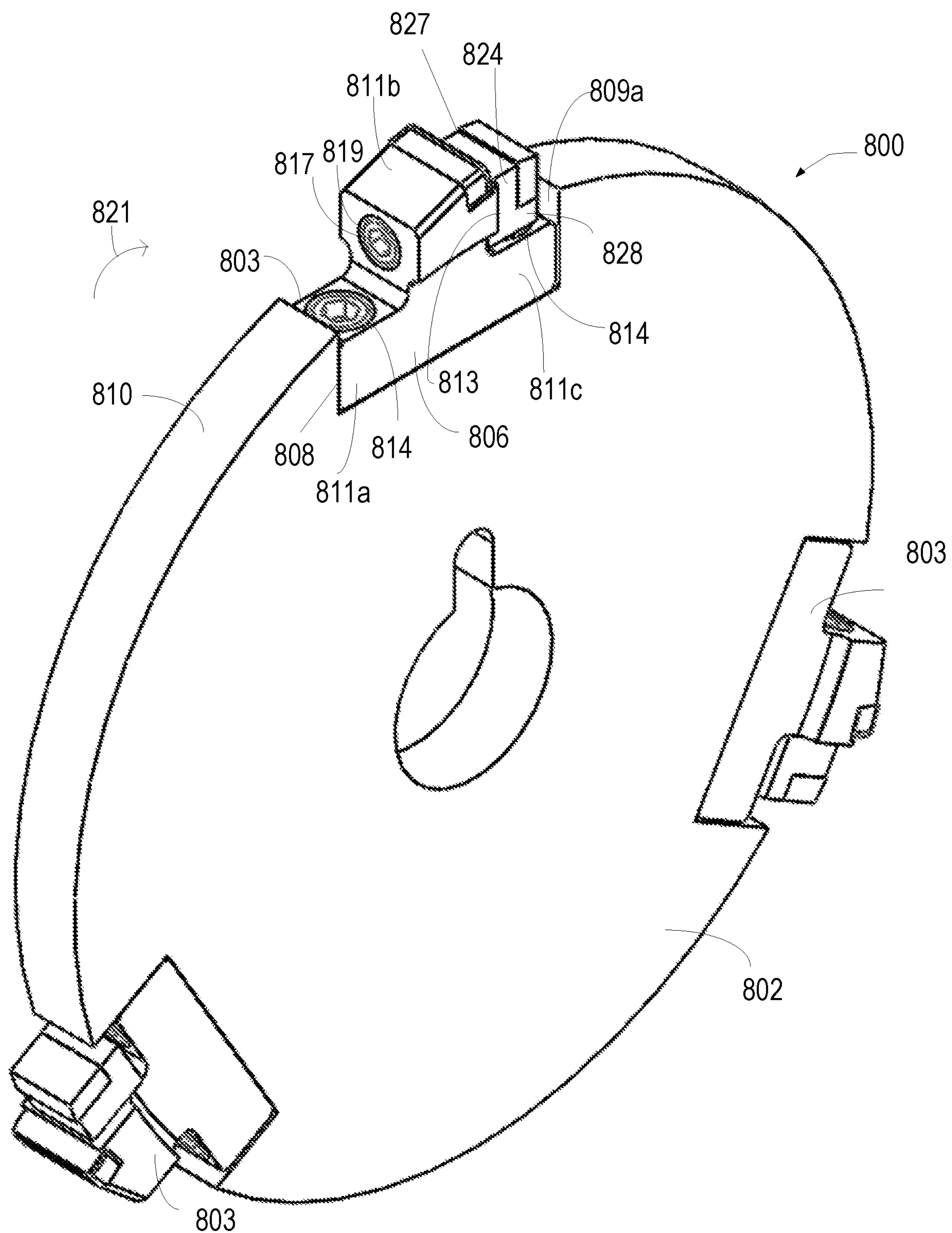
FIG. 8 is a perspective view of an example the milling cutting element system.

FIG. 8 is a perspective view of an example of a milling platform 802 and a plurality of cutter element assemblies 803 of a milling cutting element system 800 similar to the other systems described herein. The wear element 824 of the cutter element assembly 803 is coupled to the bit holder 806 in another manner. For example, the upright portion 827 of the wear element and/or the wear element base 828 is coupled to the leading face surface 813 of the cutting tool holder portion 811*b*. Fasteners 814 are shown extending through the first mounting portion 811*a* and the second mounting portion 811*c* of the bit holder 806. The fasteners 814 may be attached prior to the attachment of the wear element 824. In one example, an opening 819 is formed through the cutting tool holder portion 811*b* generally in the cutting direction 821. A lagging surface of the wear element upright portion 827 may include a threaded wear element base opening (not shown) formed therein generally in the cutting direction 821, through which a third fastener 817 may be inserted there through to couple the wear element 824 to the bit holder 806. Also shown is that the general dimension of the wear element 824 is sized to fit between the leading face surface 813 of the cutting tool holder portion 811*b* and the leading recess edge 809*a* of the recess 808 formed in the outer surface 810 so as not to overlap any portion of the milling platform 802. To this end, the wear element 824 may be partially recessed in the milling platform 802. Any of the bit holders described herein may be recessed below the outer surface of the milling platform, such that the upper surface of the bit holder is below the outer surface. For example, the upper surface of the first mounting portion 811*a* and/or the second mounting portion 811*c* of the bit holder 806 is positioned below the outer surface 810 such that a portion of the lagging recess edge and/or leading recess edge 809*a* of the recess 808 is exposed.

Figure 9:
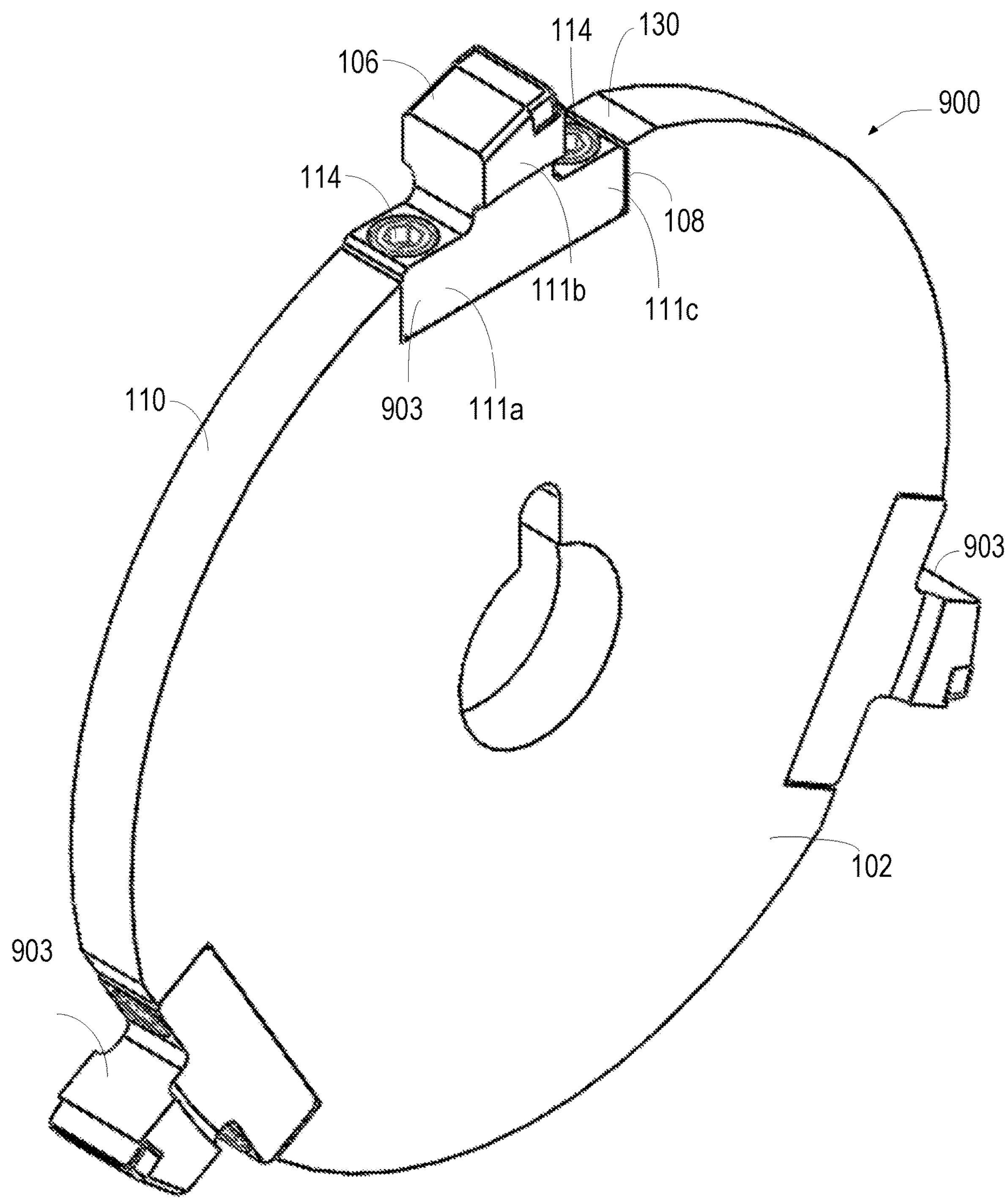
FIG. 9 is a perspective view of an example the milling cutting element system.

FIG. 9 is a perspective view of an example of the milling platform 102 of a milling cutting element system 900 similar to the other systems described herein. The cutter element assembly 903 is shown without a wear element, although as described herein the wear element may be attached to the cutting tool holder portion or the milling platform. Fasteners 114 are shown extending through the first mounting portion 111*a* and the second mounting portion 111*c* of the bit holder

106 to couple the bit holder 106 to the outer surface 110 through the recess 108 of the milling platform 102. The first mounting portion 111*a* of the bit holder 106 is shown to be sized to protrude beyond the outer surface 110. The second mounting portion 111*c* of the bit holder 106 is shown to be sized to avoid protruding beyond the outer surface 110. The planar surface 130 is shown formed in the outer surface 110 of the milling platform 102 may be aligned with the upper surface of the second mounting portion 111*c*. In an example, the system 900 may not include the planar surface 130.

Figure 10:
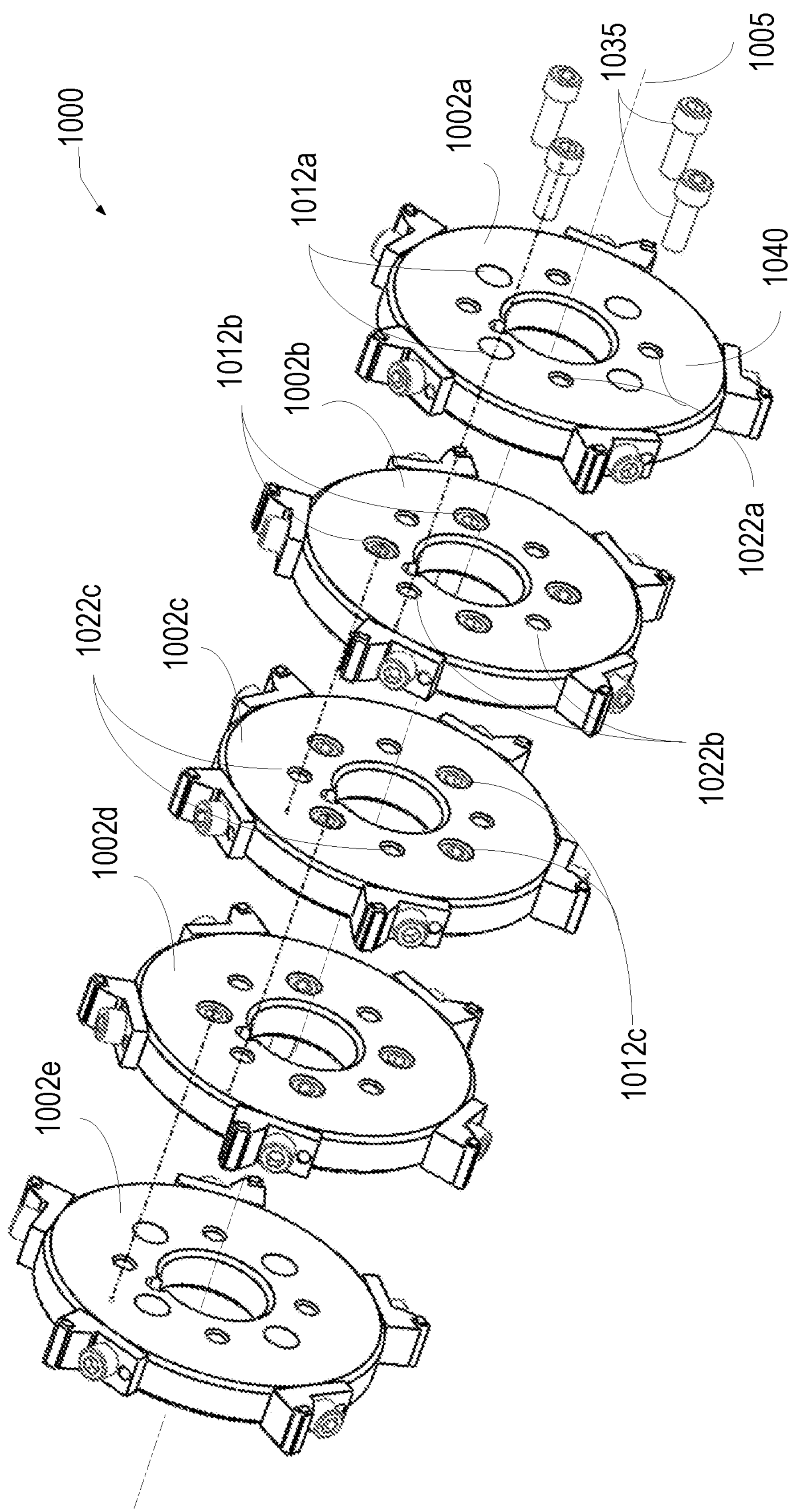
FIG. 10 is an exploded perspective view of an example of an assembly of a multi-platform milling cutting element system similar to the system illustrated in FIG. 6.

FIG. 10 illustrates an exploded view of an example of an assembly of a multi-platform cutting element system 1000 which could be applicable to any of the other systems described in the figures herein, and in particular, FIG. 6. Here, each of the milling platforms 1002*a*, 1002*b*, 1002*c*, 1002*d*, and 1002*e* (five shown) includes the first positioning apertures (e.g., four shown) alternating with the second positioning apertures (e.g., four shown). As shown, the locations of the first positioning apertures 1012*a* of the first milling platform 1002*a* are aligned with the second apertures 1022*b* of the second milling platform 1002*b*, and the locations of the second positioning apertures 1022*a* of the first milling platform 1002*a* are aligned with the first positioning apertures 1012*b* of the second milling platform 1002*b*. Further, the locations of the first positioning apertures 1012*b* of the second milling platform 1002*b* are aligned with the second positioning apertures 1022*c* of the third milling platform 1002*c*, and the locations of the second positioning apertures 1022*b* of the second milling platform 1002*b* are aligned with the first positioning apertures 1012*c* of the third milling platform 1002*c*, and so on with the other milling platforms. Platform fasteners 1035 are used to attach one or more milling platforms together to fix the relative position between the milling platforms. For example, platform fasteners 1035 are received into the first positioning apertures 1012*a* of the first milling platform 1002*a* and the second positioning apertures 1022*b* of the adjacent second milling platform 1002*b*.

In one example, the first positioning apertures 1012*a* may be formed with a reduced cross-sectional area to define an internal flange to engage a shoulder part of head of the fastener 1035. The second positioning apertures 1022*a* may be threaded. To this end, the shaft of the platform fasteners 1035 and the second positioning apertures of the adjacent milling platform may be configured for threaded engagement. The head tip of the platform fasteners 1035, once received, may be positioned below the lateral surface 1040 of the milling platform to minimize damage. For the outer milling platforms, plugs may be inserted into any unused positioning apertures to minimize dirt into the apertures. Platform fasteners 1035 may then be removed from the coupled milling platform in order to facilitate maintenance and service of each milling platform and the cutter and bit holder system.

Figure 11:
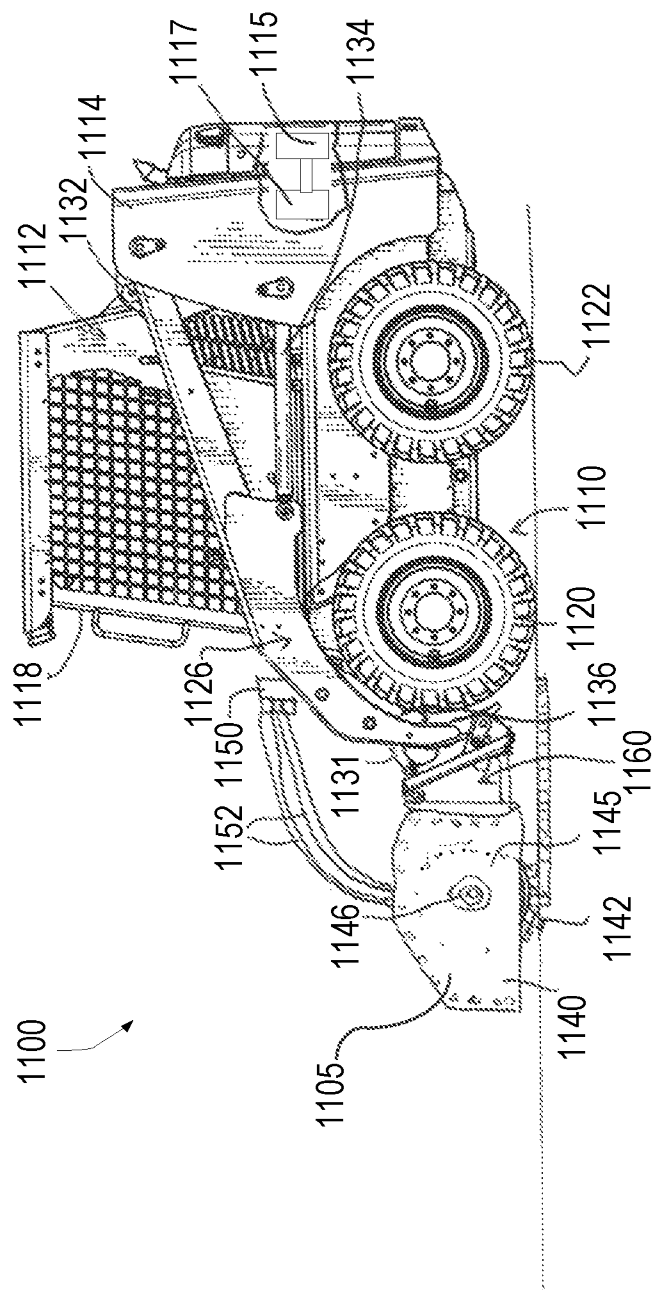
FIG. 11 is a side view of an example of a machine having a milling cutting element system.

FIG. 11 illustrates an example of a machine 1100 having any one of the cylindrical cutting systems described herein. The machine 1100 can be any form of drive device capable of rotating any one of the example cutting systems described herein. In the illustrated example, the machine is a skid steer loader having a front end attachment system configured for any of the example the cutting systems described herein. Other machines in paving or construction may be used, such as loaders, planers, or scarifiers. The machine 1100 may be equipped with multiple systems to facilitate operation of machine at a worksite, for example, a cylindrical cutting system 1105, a drive system 1110, and an engine system 1115 (shown in a rear compartment) mounted to a frame body 1112. The engine system 1115 may include an electric motor and/or an internal combustion engine. The engine system 1115 may provide power to the milling platform, directly or indirectly, or may drive a hydraulic pump 1117 (shown in cutaway), such as an axial piston pump, via output shaft to provide pressurized fluid from a reservoir (not shown) to drive other hydraulic components, such as hydraulic cylinders and motors. As will be appreciated, such machine components may be powered or driven by hydraulic motors and cylinders.

In one example, the machine frame body 1112 includes left and right upright portions 1114, respectively, and an operator's station 1118. The drive system 1110 may include ground engaging members 1120, 1122, such as wheels or tracks, mounted on and to support the body 1112. The ground engaging members 1120, 1122 may be powered and driven by the engine system 1115.

The cylindrical cutting system 1105 is attached to lift arm assemblies 1126 by a coupler assembly 1131, which is itself pivotally connected with the lift arm assemblies 1126. The lift arm assembly includes a lift arm 1132 pivotally connected with the upright portions 1114 of the body 1112 at lift arm pivot point, which may be positioned rearward of the ground engaging members 1120, 1122. A lift actuator 1134, which typically is a conventional hydraulic cylinder or other linear acting actuator, during its extension or retraction causes pivot of the lift arm 1132 relative to the body 1112, thereby lifting or lowering the cylindrical cutting system. The lift actuator 1134 is connected at one end to the upright portion of the body 1112 at a connection point located above the ground engaging members, and connected at its opposite end to the lift arm 1132. Tilt actuators 1136, which are typically hydraulic or other linear acting actuator, may cause the cylindrical cutting system 1105 to pivot relative to the lift arm 1132. The tilt actuator 1136 is connected between the lift arm 1132 and the coupler assembly 1131, as shown.

The cylindrical cutting system 1105 includes an elongated housing 1140 to surround and provide appropriate internal clearance to the milling platform with the cutter element assemblies 1142 (shown extending through an opening underneath the housing 1140) and a hydraulic motor 1145 (shown in dotted lines) that couples to the milling platform via an output shaft 1146. In one example, the hydraulic motor 1145 is coupled adjacent to the milling platform along a common axis. A hydraulic power unit 1150 may be coupled to the frame body 1112, and ultimately to the hydraulic pump and to the reservoir. Hydraulic fluid supply and drain lines 1152 may be extended between the hydraulic power unit 1150 and the hydraulic motor 1145. A hydraulic valve unit (not shown) associated upstream of the hydraulic motor may also be contained within the housing 1140 or coupled to the hydraulic power unit 1150, to control the flow and/or pressure of fluid being directed to the hydraulic motor.

The housing 1140 of the cylindrical cutting system 1105 is attached to lift arm assemblies 1126 by the coupler assembly 1131. In one example, an attachment frame 1160 is disposed between the housing 1140 and the coupler assembly 1131. The attachment frame 1160 may provide a rigid connection between the machine frame body 1112 and the housing 1140 in order to maintain a desired milling depth during operation. The attachment frame 1160 may also allow the ability for tilting and other movement of the housing 1140 relative to the machine frame body 1112 to maintain a desired milling pattern. To operate, pressurized fluid provided by the hydraulic pump may be directed to the hydraulic motor 1145 via the hydraulic power unit 1150 and the lines 1152 to cause the motor 1145 and the shaft 1146 to rotate, thereby rotating the milling platform in the cutting direction. Adjustments of the milling depth and milling pattern may be accommodated by directed fluid from the hydraulic pump to the corresponding cylinders. In some cases, and in different machines, the cylindrical cutting system is more integrated into the frame body of the machine, such as between the ground engaging members. In this case, the engine via a geared direct drive transmission may provide direct or indirect power to the shaft rotating the cutting system or the cutting system may still be powered by a hydraulic motor.

Figure 12:
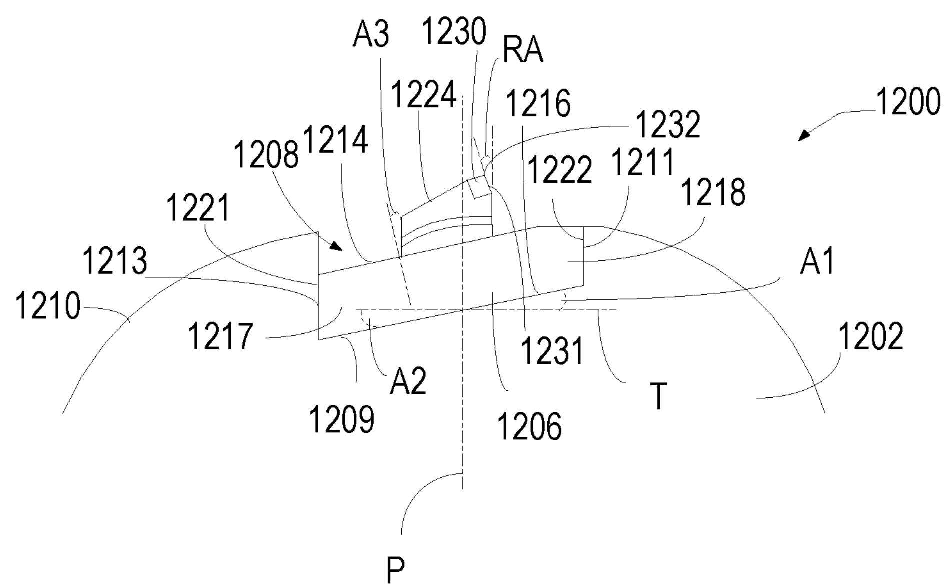
FIG. 12 is a partial frontal view of an example of a milling cutting element system.

FIG. 12 depicts another example of the milling cutting element system 1200. The bit holder 1206 may be attached to the mating surface 1209 in any manner described herein. The mating surface 1209 can be oriented obliquely at angle A1 relative to a tangential plane T that is orthogonal to the plane P extending from the axis of the milling platform 1202. The angle A1 may permit the bit holder 1206 to be angled leaning backward (as shown) or forward within the recess 1208. For example, the bit holder 1206 may be mounted as described herein within the recess 1208 formed in the outer surface 1210 of the milling platform 1202. One or both of the leading recess edge 1211 and the lagging recess edge 1213 of the recess 1208 may be oriented substantially orthogonal (about 85 to 95 degrees) relative to the tangential plane T (as shown) or, alternatively, may be oriented substantially orthogonal (85 to 95 degrees) relative to the mating surface 1209 as shown. The upper surface 1214 of the mounting portion 1217 and/or the mounting portion 1218 (when employed) may be parallel to the lower surface 1216 of the bit holder 1206. In an example, the upper surface 1214 may be generally parallel relative to the tangential plane T, and the lower surface 1216 of the bit holder 1206 may be extended at an angle A2 that is oblique to the tangential plane T in order to have a varying thicknesses along the lower portion of the bit holder that is positioned along or below the outer surface 1210. One or both of the lagging face surface 1221 and the leading face surface 1222 of the cutting tool holder portion 1224 of the bit holder 1206 may be oriented substantially parallel relative to the plane P or angled at an angle A3 that is oblique to the plane P. The bit holder 1206 may include any of the wear element configurations that is attached as described herein.

The various configurations of the bit holder, the mating surface and/or recess described herein may be selected to place the rake face surface 1231 and the cutting edge 1232 of the cutter bit 134, 1230 at the rake angle RA relative to the plane P in the range of about 5 to 20 degrees. In one example, the rake angle of the cutter bit is 10 degrees. The orientation of the cutter bit and the rake angle RA may be applied to any of the systems described herein.

FIG. 13 is a side view of an example a frontal view of an example of a milling cutting element system 1300 similar to the other systems described herein with regard to FIGS. 1-12. FIG. 1-13 illustrate, among other things, an example of a number of bit holders 106, 706, 806, 1206 recessed, or not recessed, into the milling platform 102 and the wear element 124, 824, 1224 positioned thereon. In other examples, any number of bit holders 106, 706, 806, 1206 and wear elements 124, 824, 1224 may be included. The example of FIG. 13, illustrates that the bit holder 106, 706, 806, 1206 may be configured to interchangeably receive one or more fasteners 114*a*, 114*b* or one or more pins 118*a*, 118*b* in each of one or more fastener openings 115*a*, 115*b* and respective base openings 116*a*,116*b*. As previously discussed, the one or more fasteners 114*a*, 114*b* and the one or more pins 118*a*, 118*b* are interchangeable insertable into the fastener opening 115*a*, 115*b* and respective base openings 116*a*,116*b*. The pins 118*a*, 118*b* may be threaded. In addition, the wear element 124 may be omitted. The discussed features and configurations of FIGS. 1-13 are interchangeably useable.

In other examples, other configurations are possible in addition to those illustrated. Thus, the foregoing description and drawings should be regarded as illustrative rather than limiting.

The invention claimed is:

1. A cutting system comprising:

a bit holder comprising a cutting tool holder portion extending away from a mounting portion, the bit holder having a leading edge, a lagging edge opposite the leading edge, an upper surface, a lower surface opposite the upper surface, and a pair of lateral surfaces together defining an outer surface of the bit holder;

a milling platform having a circumferential outer surface and being rotatable about an axis, the milling platform including opposing lateral surfaces extending radially outward away from the axis a first predetermined distance to the circumferential outer surface except where a plurality of recessed mounting surfaces are sequentially formed in the circumferential outer surface, each of the recessed mounting surfaces defined by a leading recess edge interconnected by a bottom mating surface with a lagging recessed edge, the bottom mating surface extending to the opposing lateral surfaces, wherein the leading recess edge, the lagging recessed edge, and the bottom mating surface are planar surfaces, and wherein the opposing lateral surfaces extend radially a second predetermined distance between the axis and the bottom mating surface, the second predetermined distance being less than the first predetermined distance by at least a distance between the lower surface and the upper surface of the mounting portion;

the bit holder positioned in a corresponding recessed mounting surface to align the leading and lagging edges of the bit holder with respective leading and lagging recessed edges of the corresponding recessed mounting surface and to align the lower surface with the bottom mating surface such that the pair of lateral surfaces are exposed radially outward from the lateral edges;

the bit holder comprising a fastener bit holder opening in the lower surface, the fastener bit holder opening aligned with a fastener base opening in the bottom mating surface; and a fastener engaged with the fastener bit holder opening and the fastener base opening so as to extend through fastener bit holder opening and extend into the fastener base opening to maintain the lower surface of the bit holder in contiguous contact with the bottom mating surface.

2. The cutting system of claim 1, wherein the fastener is positioned in closer proximity than the cutting tool holder portion to the leading edge of the bit holder and the leading recessed edge.

3. The cutting system of claim 1, wherein the cutting tool holder portion extends away from the mounting portion of the bit holder between corresponding openings in the bit holder and the bottom mating surface.

4. The cutting system of claim 1, wherein the cutting tool holder portion includes a cutter bit and a width of lateral opposing surfaces of the milling platform is less than a width of the cutter bit.

5. The cutting system of claim 1, wherein the fastener is threaded and is removably engaged in the fastener base opening in the bottom mating surface.

6. The cutting system of claim 1, wherein the fastener bit holder opening extends through the upper surface and the lower surface of the bit holder and includes a reduced cross sectional area defining an internal flange that engages with a shoulder included as part of the fastener such that a head of the fastener is recessed into the bit holder below the upper surface.

7. The cutting system of claim 1, wherein the fastener is accessible from the upper surface of the bit holder and extends through the openings in the bit holder and the bottom mating surface into the milling platform.

8. The cutting system of claim 1, wherein the fastener is positioned between the cutting tool holder portion and the leading edge of the bit holder and extends through the openings in the bit holder and the bottom mating surface into the milling platform.

9. The cutting system of claim 1, wherein the bit holder further comprises a pin bit holder opening in the lower surface, the pin bit holder opening aligned with a pin base opening in the bottom mating surface, and the cutting system further comprises a pin contiguously engaged with pin bit holder opening and with the pin base opening to maintain alignment of the bit holder on the milling platform in a cutting direction, wherein the pin is inaccessible from the upper surface of the bit holder and extends through only a portion of the bit holder and into the milling platform via the pin bit holder opening, the lower surface, the bottom mating surface, and the pin base opening.

10. The cutting system of claim 1, wherein the pair of lateral surfaces of the bit holder define a lateral width of the bit holder, the lateral width of the bit holder being at least as wide as the lateral edges of the bottom mating surface of the milling platform such that the pair of lateral surfaces of the bit holder are exposed and extend radially outward away from the axis and in parallel with the opposing lateral surfaces of the milling platform without contacting the milling platform.

11. A cutting system, comprising:

a milling platform rotatable about an axis, the milling platform including a circumferential outer surface defined about the axis by a first predetermined radial distance from the axis, and a recessed mating surface on the outer surface defined about the axis by a second predetermined radial distance from the axis, a lateral width of the circumferential outer surface being equal to a lateral width of the mating surface, the mating surface including a fastener base opening;

a bit holder having a leading edge and a lagging edge opposite the leading edge and lateral edges linearly extending between the leading edge and the lagging edge;

the bit holder having a radially inward facing surface engaging the corresponding mating surface of the milling platform such that the leading and lagging edges engage with the mating surface and the lateral edges are exposed and accessible, the radially inward facing surface including a fastener bit holder opening in alignment with the corresponding fastener base opening of the milling platform to receive a fastener, wherein the fastener removably couples the bit holder to the milling platform; and a cutter bit coupled with the bit holder and disposed radially outward from the radially inward facing surface;

wherein the bit holder includes a mounting portion through which the fastener bit holder opening extends, and a cutting tool holder portion extending away from the mounting portion and in closer proximity to a lagging edge of the bit holder than the mounting portion, the cutting tool holder portion including the cutter bit, and wherein the first predetermined radial distance is greater than the second predetermined radial distance by at least a distance between the radially inward facing surface and a radially outward facing surface of the mounting portion.

12. The cutting system of claim 11, wherein the cutter bit comprises polycrystalline diamond, and is oriented at a predetermined rake angle relative to a plane extending from the axis.

13. The cutting system of claim 11, wherein the milling platform includes a planar surface formed in the outer surface to define the mating surface, the planar surface extending the lateral width of the mating surface and a length of the planar surface defined by a leading recess edge of the planar surface and a lagging recessed edge of the planar surface, wherein the leading recess edge and the lagging recessed edge are planar surfaces that radial extend between the first predetermined radial distance and the second predetermined radial distance, an entrance to the fastener bit holder opening separately formed in the planar surface and extending radially inward toward the axis.

14. The cutting system of claim 11, wherein the milling platform is a first milling platform, the cutting system further comprising a second milling platform, each of the first milling platform and the second milling platform comprising a slot formed in an aperture positioned coaxial with the axis and a plurality of the bit holders spaced circumferentially from one another along the respective outer surfaces such that the bit holders on the first milling platform are staggered in a cutting direction from the bit holders on the second milling platform when the aperture and slot of each of the first and second milling platforms are aligned.

15. The cutting system of claim 14, wherein a confronting lateral surface of the first milling platform is positioned adjacent a confronting lateral surface of the second milling platform with a gap therebetween.

16. The cutting system of claim 15, wherein a width of the cutter bit of the first milling platform is greater than a width of the first milling platform so that a portion of the cutter bit of the first milling platform overlaps the gap and a portion of the cutter bit of the second milling platform, and a width of the cutter bit of the second milling platform is greater than a width of the second milling platform so that a portion of the cutter bit of the second milling platform overlaps the gap and a portion of the cutter bit of the first milling platform.

17. A cutting system, comprising:

a plurality of bit holders configured to be positioned on a circumferential outer surface of each of a plurality of milling platforms rotatable about an axis, each of the bit holders comprising a radially inward facing planar surface for engagement with a corresponding recessed planar mating surface formed in the outer surface of a respective milling platform, wherein a lateral width of the mating surface is equal to a lateral width of the circumferential outer surface and the radially inward facing planar surface includes a fastener bit holder opening in alignment with a corresponding fastener base opening formed in the recessed mating surface of the respective milling platform to receive a fastener, wherein the fastener removably couples the bit holder to the milling platform; each of the bit holders further comprising:

a leading edge, a lagging edge opposite to the leading edge, an upper surface opposite the radially inward facing planar surface, and a pair of lateral surfaces together defining an outer surface of a bit holder body, wherein the recessed mating surface includes a leading recess edge abutting and extending along the leading edge, a bottom mating surface abutting and extending along the radially inward facing planar surface and a lagging recessed edge abutting and extending along the lagging edge such that the pair of lateral surfaces are exposed and radially aligned parallel with opposing lateral surfaces extending radially outward away from the axis to the recessed planar mating surface formed in the outer surface of the respective milling platform;

wherein the fastener bit holder opening is formed in the bit holder body to extend from the radially inward facing planar surface through the upper surface;

wherein the fastener bit holder opening is positioned on the bit holder body between the leading edge, the lagging edge and the pair of lateral surfaces;

a cutting tool holder portion extending away from the upper surface such that the fastener bit holder opening is relatively closer to the leading edge than the cutting tool holder portion; and a cutter bit coupled to the cutting tool holder portion.

18. The cutting system of claim 17, wherein the cutting tool holder portion includes a notch formed along an upper surface of the cutting tool holder portion, and wherein the cutter bit is coupled to the cutting tool holder portion within the notch.

19. The cutting system of claim 17, wherein a width of the cutter bit is greater than a width of the cutting tool holder portion of each of the bit holders.

* * * * *